United States Patent
Agarwal et al.

(10) Patent No.: US 10,613,983 B2
(45) Date of Patent: Apr. 7, 2020

(54) PREFETCHER BASED SPECULATIVE DYNAMIC RANDOM-ACCESS MEMORY READ REQUEST TECHNIQUE

(71) Applicant: Advanced Micro Devices, Inc., Santa Clara, CA (US)

(72) Inventors: Tanuj Kumar Agarwal, Bangalore (IN); Anasua Bhowmik, Bangalore (IN); Douglas Benson Hunt, Ft. Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/925,859

(22) Filed: Mar. 20, 2018

(65) Prior Publication Data

US 2019/0294546 A1    Sep. 26, 2019

(51) Int. Cl.
*G06F 12/08* (2016.01)
*G06F 12/0862* (2016.01)
*G06F 3/06* (2006.01)
*G06F 12/0897* (2016.01)

(52) U.S. Cl.
CPC ........ *G06F 12/0862* (2013.01); *G06F 3/0611* (2013.01); *G06F 3/0653* (2013.01); *G06F 3/0683* (2013.01); *G06F 12/0897* (2013.01); *G06F 2212/1024* (2013.01); *G06F 2212/602* (2013.01)

(58) Field of Classification Search
CPC .... G06F 3/0611; G06F 3/0653; G06F 3/0683; G06F 12/0859; G06F 12/0862; G06F 12/0884; G06F 12/0897; G06F 2212/1024; G06F 2212/602
USPC .......................................... 711/122, 137, 204
See application file for complete search history.

(56) References Cited

U.S. PATENT DOCUMENTS

| | | | |
|---|---|---|---|
| 10,180,905 B1 * | 1/2019 | Meier | ................. G06F 12/0862 |
| 2002/0161979 A1 | 10/2002 | Arimilli et al. | |
| 2003/0084274 A1 | 5/2003 | Gaither et al. | |
| 2006/0161762 A1 | 7/2006 | Eisen et al. | |
| 2008/0028150 A1 | 1/2008 | Toussi | |
| 2008/0147977 A1 | 6/2008 | Toussi | |

(Continued)

OTHER PUBLICATIONS

International Search Report and Written Opinion for PCT Application No. PCT/US2019/019766, dated Jun. 11, 2019, 9 pages.

(Continued)

*Primary Examiner* — Gary J Portka
(74) *Attorney, Agent, or Firm* — Zagorin Cave LLP

(57) ABSTRACT

A method includes monitoring a request rate of speculative memory read requests from a penultimate-level cache to a main memory. The speculative memory read requests correspond to data read requests that missed in the penultimate-level cache. A hit rate of searches of a last-level cache for data requested by the data read requests is monitored. Core demand speculative memory read requests to the main memory are selectively enabled in parallel with searching of the last-level cache for data of a corresponding core demand data read request based on the request rate and the hit rate. Prefetch speculative memory read requests to the main memory are selectively enabled in parallel with searching of the last-level cache for data of a corresponding prefetch data read request based on the request rate and the hit rate.

20 Claims, 5 Drawing Sheets

(56) References Cited

U.S. PATENT DOCUMENTS

| | | |
|---|---|---|
| 2009/0024835 A1 | 1/2009 | Fertig et al. |
| 2009/0106498 A1 | 4/2009 | Lepak et al. |
| 2009/0150401 A1 | 6/2009 | Allen, Jr. et al. |
| 2009/0150572 A1 | 6/2009 | Allen, Jr. et al. |
| 2009/0150618 A1 | 6/2009 | Allen, Jr. et al. |
| 2009/0150622 A1 | 6/2009 | Allen, Jr. et al. |
| 2011/0078380 A1* | 3/2011 | Gendler .............. G06F 12/0862 711/122 |
| 2012/0072702 A1 | 3/2012 | Pierson et al. |
| 2012/0124345 A1 | 5/2012 | Denman et al. |
| 2014/0089592 A1 | 3/2014 | Biswas et al. |
| 2015/0006821 A1 | 1/2015 | Gara et al. |
| 2015/0089157 A1 | 3/2015 | Lee et al. |
| 2016/0062768 A1 | 3/2016 | Jagannathan et al. |
| 2016/0179544 A1 | 6/2016 | Heinecke et al. |
| 2018/0004670 A1* | 1/2018 | Sudhir ................ G06F 12/0862 |
| 2019/0138449 A1* | 5/2019 | Tian .................... G06F 12/0811 |

OTHER PUBLICATIONS

Son, Y., et al., "Reducing Memory Access Latency with Asymmetric DRAM Bank Organizations," ACM 2013, pp. 380-391.

Wu, C., et al., "SHiP: Signature-based Hit Predictor for High Performance Caching," ACM 2011, 12 pages.

\* cited by examiner

PREFETCHER BASED SPECULATIVE DYNAMIC RANDOM-ACCESS MEMORY READ REQUEST TECHNIQUE

BACKGROUND

Description of the Related Art

In general, to bridge the gap between processor core speed and the speed of a main memory, a processor system uses a multilevel cache hierarchy, where each cache is larger than its predecessor and faster than its successor. FIG. 1 illustrates an exemplary processing system including a multilevel cache hierarchy having three cache levels and a main memory. Processing system 100 includes processor 102, which has a split level-one cache (e.g., instruction-cache 106 and data-cache 108) coupled to level-two cache 110. Level-three cache 112 is external to processor 102 and communicates with main memory 114, which may include conventional off-chip dynamic random-access memory (DRAM), faster, on-chip DRAM and/or includes a mix of memory technologies such as DRAM, static random-access memory (SRAM), phase-change memory, memristors, or other memory type). Servicing misses from the last-level cache (e.g., level-three cache 112) by accessing main memory 114 has a high memory access latency (e.g., a memory access latency of at least 200 clock cycles), which can substantially impact system performance. Accordingly, improved techniques for accessing memory are desired.

SUMMARY OF EMBODIMENTS OF THE INVENTION

In at least one embodiment, a method for reducing memory access latency of a memory system includes monitoring a request rate of speculative memory read requests from a penultimate-level cache to a main memory. The speculative memory read requests correspond to data read requests that missed in the penultimate-level cache. Each of the speculative memory read requests is a core demand speculative memory read request or a prefetch speculative memory read request. Each of the data read requests is a core demand data read request or a prefetch data read request. The method includes monitoring a hit rate of searches of a last-level cache for data requested by the data read requests. Each of the speculative memory read requests is issued in parallel with a search of the last-level cache for corresponding data. The method includes selectively enabling core demand speculative memory read requests to the main memory in parallel with searching of the last-level cache for data of a corresponding core demand data read request based on the request rate and the hit rate. The method includes selectively enabling prefetch speculative memory read requests to the main memory in parallel with searching of the last-level cache for data of a corresponding prefetch data read request based on the request rate and the hit rate. Each of the speculative memory read requests may be an actual speculative memory read request issued in parallel with the searching or an unrealized speculative memory read request.

In at least one embodiment, a memory system includes a penultimate-level cache, a last-level cache, a main memory, a first counter, a second counter, and a controller associated with the penultimate-level cache. The first counter is configured to store a request rate of speculative memory read requests from the penultimate-level cache to the main memory. Each of the speculative memory read requests is in response to a miss in the penultimate-level cache of a corresponding data read request. The second counter is configured to store an indicator of a hit rate of searches of the last-level cache for data of data read requests missed in the penultimate-level cache. The controller is configured to selectively enable core demand speculative memory read requests to the main memory in parallel with the searches based on the request rate, the hit rate, a predetermined request rate threshold value, and a predetermined hit rate threshold value. The controller is configured to selectively enable prefetch speculative memory read requests to the main memory in parallel with the searches based on the request rate, the hit rate, the predetermined request rate threshold value, and the predetermined hit rate threshold value. Each of the speculative memory read requests is a core demand speculative memory read request or a prefetch speculative memory read request. The speculative memory read request controller may be configured to increment the first counter in response to each miss in the penultimate-level cache, increment the second counter in response to each hit in the last-level cache, and periodically reset the first counter and the second counter.

In at least one embodiment, a method for operating a memory system includes enabling core demand speculative memory read requests to a main memory in parallel with searching of a last-level cache for data requested by core demand data read requests that missed in a penultimate-level cache. The method includes disabling prefetch speculative memory read requests to the main memory for data requested by prefetch data read requests that missed in the penultimate-level cache. The method includes monitoring a request rate of speculative memory read requests issued from the penultimate-level cache to the main memory. The request rate is based on core demand speculative memory read requests and unrealized prefetch speculative memory read requests for prefetch data read requests that missed in the penultimate-level cache. The method includes monitoring a hit rate of the searching of the last-level cache. The method includes, in response to the request rate being less than a predetermined request rate threshold value and the hit rate being less than a predetermined hit rate threshold value: enabling the core demand speculative memory read requests and disabling the prefetch speculative memory read requests.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

A technique for reducing the miss latency of a last-level cache (e.g., level-three cache) includes issuing speculative DRAM read requests (i.e., speculative memory read requests). The technique issues DRAM read requests speculatively to main memory prior to actual demand read requests to reduce the average last-level cache miss latency. Although the speculative DRAM read requests increase the instructions-per-cycle for the system, in execution, conventional speculative DRAM read requests may adversely affect system performance by increasing congestion at the interface to main memory. Thus, conventional speculative DRAM read requests may increase memory system latency rather than reduce it. As the number of threads executing in a system increases, shared last-level cache misses increase due to increased contention, thus increasing memory system access latency.

Figure 1:
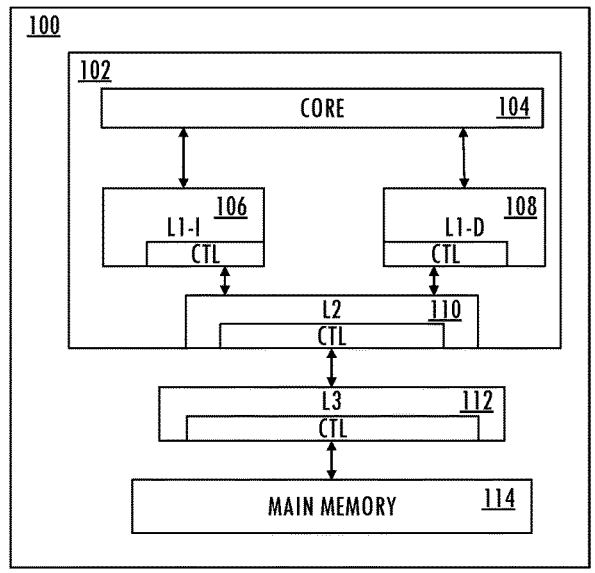
FIG. 1 illustrates a functional block diagram of a processing system including one processing core and a multilevel memory system.
Figure 2:
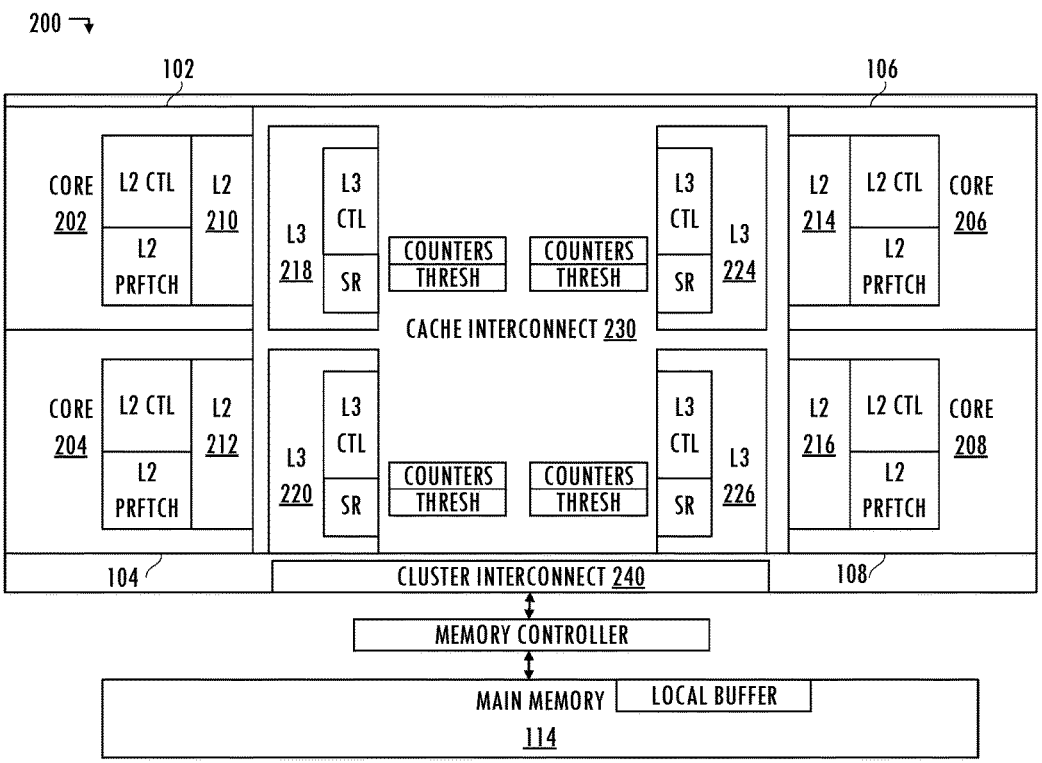
FIG. 2 illustrates a functional block diagram of a multi-core processing system including a multilevel memory system.
Figure 3:
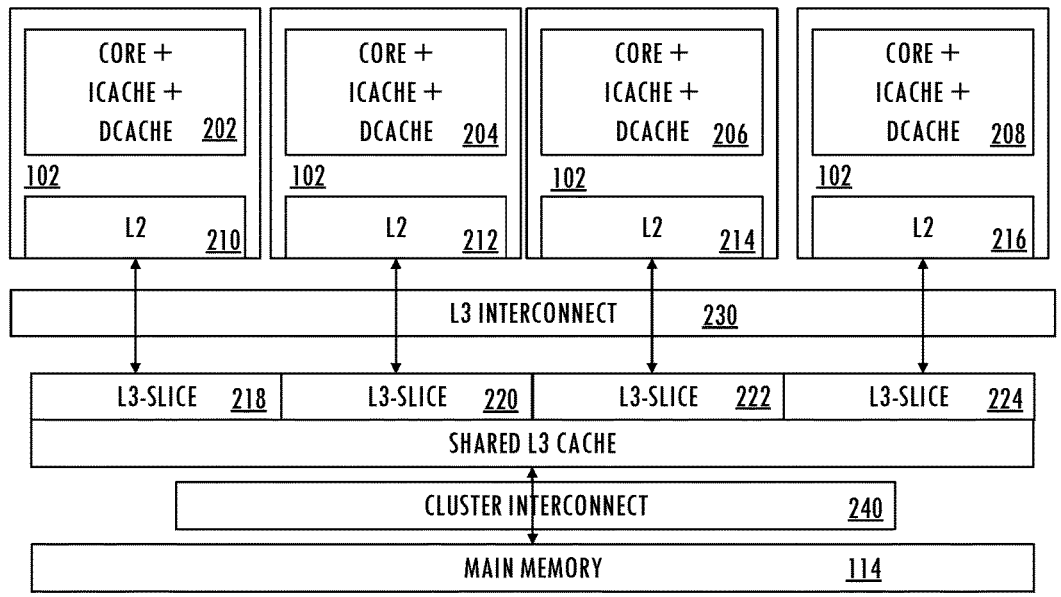
FIG. 3 illustrates another functional block diagram of the multi-core processing system of FIG. 2 showing request and data flow.

FIGS. 2 and 3 illustrate multi-core processing system 200 including a cluster of processors: processor 102, processor 104, processor 106, and processor 108, which include processing core 202, processing core 204, processing core 206, and processing core 208, respectively. Each processing core can execute at least two threads simultaneously, includes a private, split level-one cache (i.e., a level-one cache split into an instruction cache and a data cache), and a corresponding private, unified, level-two cache. Processor 102, processor 104, processor 106, and processor 108 of the cluster of processors share a level-three cache (e.g., 8 MB) that is partitioned into cache slice 218, cache slice 220, cache slice 224, and cache slice 226 (e.g., 2 MB slices). Level-two cache 210, level-two cache 212, level-two cache 214, and level-two cache 216 are strictly inclusive of the corresponding level-one cache, i.e., all lines present in the corresponding level-one cache are also present in the level-two cache. However, the level-two caches are mostly exclusive of the level-three cache, i.e., most of the level-two cache lines are not present in the level-three cache. The level-three cache also maintains the level-two tags in shadow tag structures that are used to determine whether particular lines are present in any other level-two cache of the cluster of processors in multi-core processing system 200.

Cache interconnect 230 provides communications between the level-two caches and the level-three cache. Cluster interconnect 240 provides communications between cache slice 218, cache slice 220, cache slice 224, and cache slice 226 of the level-three cache and main memory 114. Memory requests and associated data flow through cluster interconnect 240 to main memory 114 and responses flow back through cluster interconnect 240 to the level-three cache. For example, when a memory request misses in a level-two cache, the level-two cache controller sends the memory request to a particular slice of the level-three cache based on particular address bits. If the slice of the level-three cache that stores that data line results in a level-three cache hit, then the level-three cache sends the data to the requesting level-two cache. If the data line is not present in the level-three cache (i.e., the line misses the level-three cache), then the level-three cache first determines whether that line is present in any of the other level-two caches of the cluster of processors, e.g., by inspecting the level-two tags stored in the shadow tag structures of the level-three cache. If that data line is present in the level-two cache of any other core, then the level-three cache initiates a cache-to-cache transfer from a level-two cache to another level-two cache and does not send that request to main memory 114. However, if the data line is not present in any level-two cache of the cluster of processors, then the level-three cache controller sends that memory request to main memory 114. In general, cache-to-cache transfers are rare but may occur when two or more threads executing on different processing cores share data or instructions.

Figure 4:
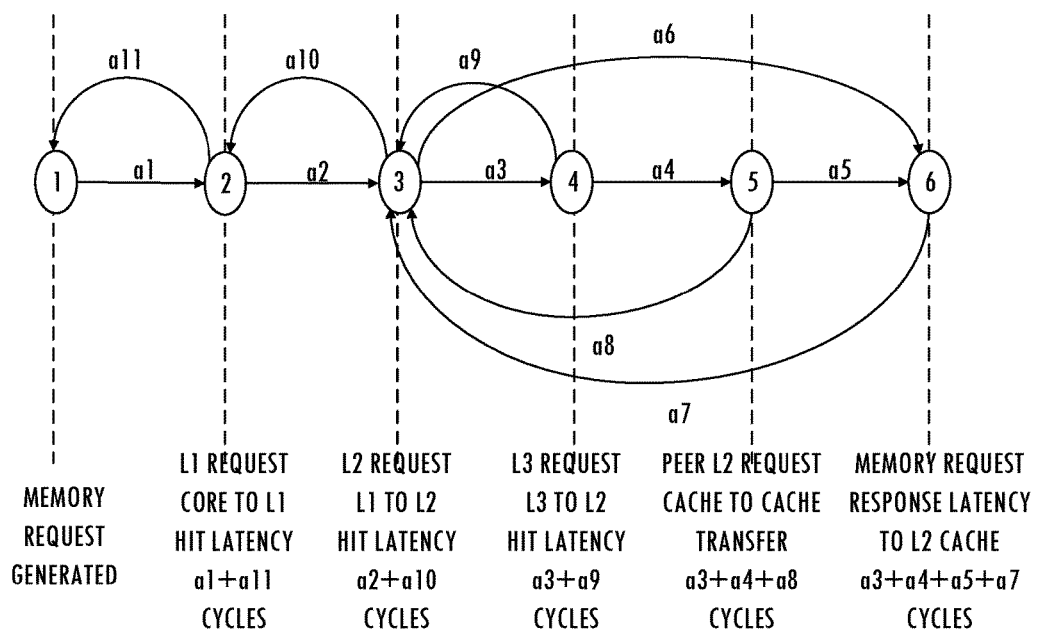
FIG. 4 illustrates a sequence of memory system events and associated latencies for a memory request originated by a processing core of FIG. 1 or 2.

Referring to FIG. 4, a timeline represents a sequence of events for a memory request issued by a processing core. Arrows pointing to the right represent the request path from a requesting core to the memory system and arrows pointing towards the left represent the response path from the memory system to the requesting core. Each arrow has an associated weight that represents a quantity of associated clock cycles. In response to a miss, a corresponding controller passes the request to a next cache or memory component. The total time required to service the memory request is the sum of all edges of a closed loop between node 1 corresponding to the requesting core, and the node corresponding to a first level of the memory system containing the requested data, i.e., the total latency from the requesting core to a level of memory storing the requested data line, and the response from that level of memory back to the requesting core. The latencies are minimum latencies in the absence of other conflict or congestion in the memory controllers or interconnect networks. For example, the latency from node 3 to node 5 is a minimum of $a3+a4$ clock cycles, which is the latency between detection of a miss in the level-two cache to when the memory request is sent to main memory in anticipation of a miss in the level-three cache and the other level-two caches of the cluster of processors.

System analysis (e.g., using a SPECint benchmark suite) indicates that on average a majority (e.g., 54%) of memory requests that miss the level-two cache also miss the level-three cache when a single thread runs on the cluster of processing cores using the entire level-three cache. When multiple threads execute simultaneously sharing the level-three cache, that miss rate increases. For example, when eight threads execute the SPECint benchmark suite, 70% of level-two cache misses also miss the level-three cache and miss the other level-two caches of the cluster of processors. Main memory 114 must service all of those memory requests and will incur extra latency in the level-three cache. That penalty increases as the amount of congestion increases at the level-three cache controller.

Figure 5:
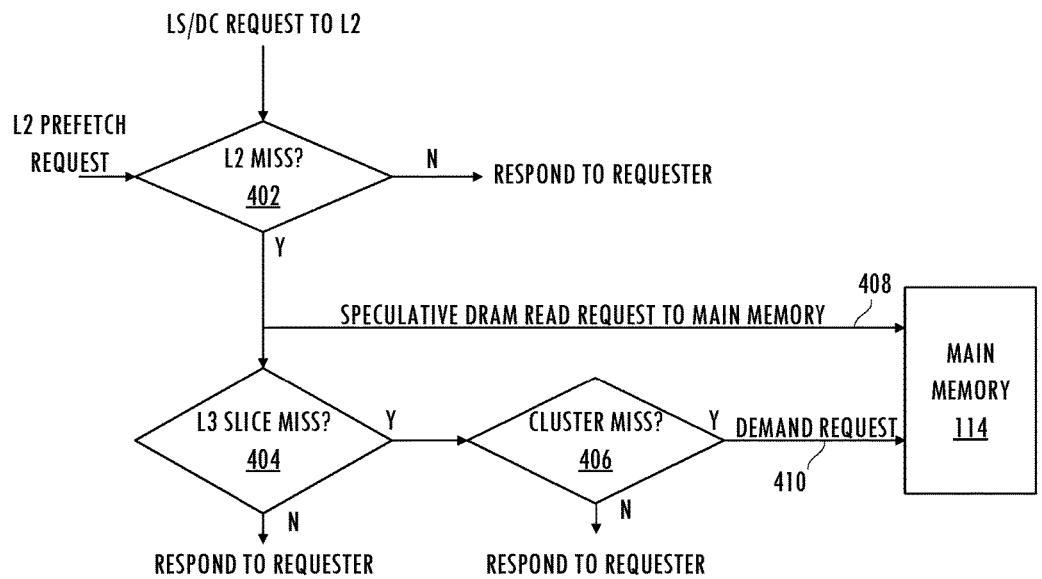
FIG. 5 illustrates an exemplary information and control flow for issuance of a speculative DRAM read request by the multi-core processing system of FIG. 2.

Accordingly, the level-two cache memory controller implements speculative DRAM read requests to reduce memory latency. Referring to FIGS. 2, 3, and 5, the penultimate-level (e.g., level-two) cache controller receives memory requests from the prior level (e.g., level-one) cache controller. Those received memory requests may be prefetch requests generating by prefetch logic in a corresponding processing core or may be core demand requests from the corresponding processing core.

If the target data line resides in the level-two cache (i.e., hits the level-two cache), then the level-two cache provides a memory request response. If the requested data line does not reside in the level-two cache (i.e., misses the level-two cache) (402), then the level-two cache controller issues a speculative DRAM read request to main memory 114 (408) in parallel with forwarding the memory request to the last-level cache (e.g., a corresponding slice of the level-three cache). If the memory request misses the corresponding slice of the level-three cache (404), then the level-three cache controller forwards the memory request to cluster interconnect 240 to determine if the requested data line resides in a level-two cache associated with another core of the cluster of processing cores. If the received memory request misses in the cluster of processing cores (406), then the level-three cache controller forwards the demand memory request (410) to main memory 114. The memory requests sent from the level-two cache directly to main memory 114 (i.e., bypassing the level-three cache and cluster interconnect 240) are considered speculative because any conventional memory requests sent in parallel with the speculative DRAM read requests that hit the level-three cache need not be serviced by main memory 114, rendering the speculative DRAM read request unnecessary. However, speculative DRAM read requests reduce the latency of memory requests that miss the level-three cache, as described above with respect to FIG. 4.

Referring to FIGS. 2 and 3, main memory 114 handles speculative DRAM read requests similarly to memory requests forwarded from the level-three cache and reads corresponding data from main memory 114. However, instead of sending the speculative DRAM request data back to the level-three cache, the speculative DRAM read request data is stored in a local buffer inside main memory 114. When the core demand request arrives at main memory 114, if it hit a speculative DRAM request with same memory address, then the memory controller sends the response data from the buffer. Thus, the demand request benefits from the speculative DRAM read requests due to reduced overall memory read latency. The speculative DRAM read requests that correspond to demand requests are considered beneficial speculative DRAM read requests that improve system performance. However, if the memory request that misses the level-two cache hits the level-three cache or the cluster of processing cores, then no demand request is sent to the memory. The speculative DRAM read requests generated for such memory requests are not useful and considered detrimental speculative DRAM read requests. The data read by the detrimental speculative DRAM read requests reside in the local buffer and eventually data from other speculative DRAM read requests overwrites those data.

The speculative DRAM request policy sends speculative DRAM read requests to main memory 114 for all memory requests that miss the level-two cache. Although beneficial speculative DRAM read requests improve performance, detrimental speculative DRAM read requests unnecessarily fill the local buffer with data. A core demand request that is issued after a speculative DRAM request is delayed by the detrimental speculative DRAM read request slows down the system. When a single thread executes in the cluster of processing cores, the detrimental speculative DRAM read requests do not substantially degrade the system performance. However, as the number of threads executing on the cluster of processing cores increases, the network and memory systems become a bottleneck, and detrimental speculative DRAM read requests substantially degrade system performance. Thus, detrimental, speculative DRAM read requests interfere with other memory requests, waste bandwidth, degrade the overall system performance, and increase power consumption. Accordingly, a reduction in the detrimental speculative DRAM read requests would improve speculative DRAM request accuracy, overall system performance, and reduce power consumption.

In at least one embodiment, the penultimate-level cache controller implements a speculative DRAM request policy that controls speculative DRAM read request traffic and accuracy to improve system performance. The policy intelligently adjusts the number of speculative DRAM read requests issued by the level-two cache controller. The policy improves the quality of speculative DRAM read requests and measures the accuracy (i.e., quality or effectiveness) of speculative DRAM read requests by the number of corresponding hits in the last-level cache. Periodically, the penultimate-level cache controller compares the request rate counter and the hit rate counter to corresponding predetermined threshold values. The predetermined threshold values may be configured during BIOS or other system initialization sequence. If either of the counters exceeds its corresponding predetermined threshold, the penultimate-level cache controller determines that the speculative DRAM read requests are ineffective for adding to memory contention or for having low accuracy. The penultimate-level cache controller suppresses the issue of speculative DRAM read requests until each counter is below the corresponding predetermined threshold value. The penultimate-level cache controller tracks the speculative DRAM read request traffic and accuracy for unrealized speculative DRAM read requests (i.e., speculative DRAM read requests that the penultimate-level cache controller would have issued if the speculative DRAM read requests were enabled) for demand requests to determine whether the memory contention and/or accuracy issues have been resolved. Once both issues have been resolved, the penultimate-level cache controller resumes issuing speculative DRAM read requests. That technique is effective in reducing system performance degradation by uncontrolled speculative DRAM read requests. However, in some applications, that scheme does fully not take advantage of speculative DRAM read requests.

Each level-two cache controller maintains counters for level-two cache misses and level-three cache misses. Those counters may be included in the level-two cache or in cache interconnect 230. The level-two cache controller uses those counters to estimate speculative DRAM request rate and speculative DRAM request rate accuracy, respectively. The level-two cache controller updates the level-three cache miss counter using feedback from the level-three cache controller received with a response from the level-three cache. The level-two cache controller evaluates the interference due to inaccurate speculative DRAM read requests and adjusts the rate of speculative DRAM read requests accordingly, thereby improving accuracy of the speculative DRAM read requests.

Figure 6:
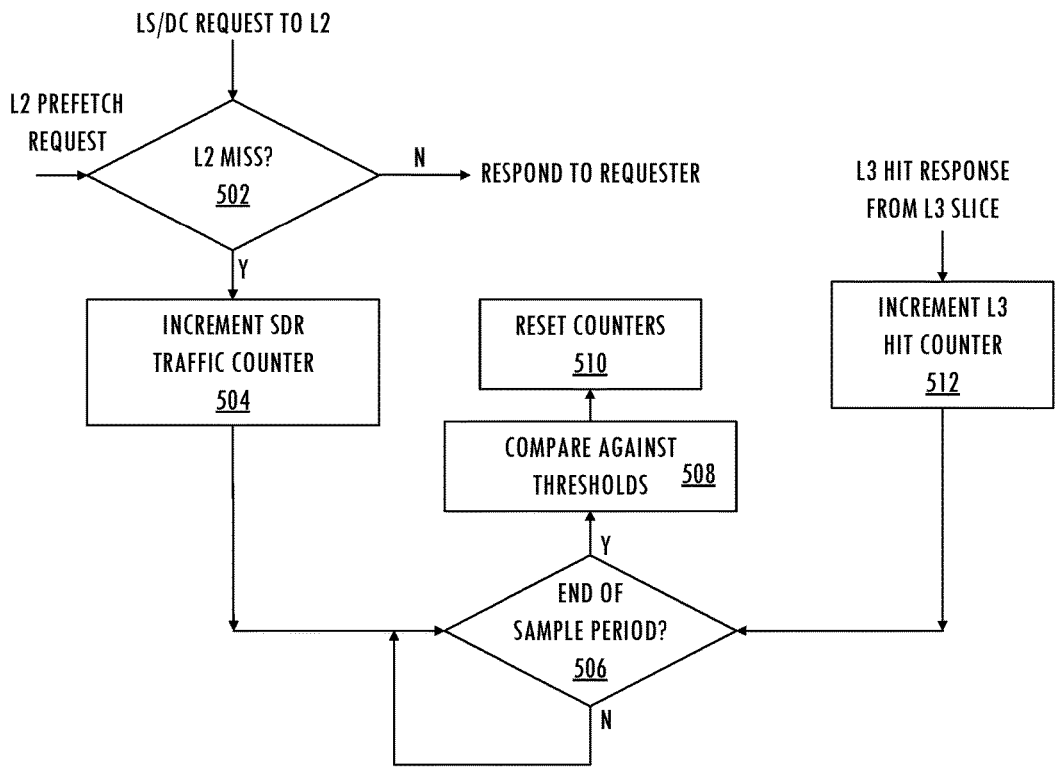
FIG. 6 illustrates an exemplary information and control flow for monitoring speculative DRAM read traffic and accuracy of speculative DRAM read of the multi-core processing system of FIG. 2.

The last-level cache controller (or cluster interconnect network 240) between a cluster of processing cores and main memory 114 counts the speculative DRAM read requests and demand requests passing through it to measure the contention. Referring to FIG. 6, if the received memory request misses the level-two cache (502), then cluster interconnect network 240 increments a corresponding speculative DRAM read request traffic counter (504). If a sample period has ended (506), then the penultimate-level cache controller compares contents of the speculative DRAM read request traffic counter to a corresponding predetermined threshold value, uses the results of the comparison (508), and resets the counter (510). Meanwhile, if the penultimate-level cache controller receives a hit response from the last-level cache (e.g., a slice of the level-three cache), then the penultimate-level cache controller increments a last-level cache hit counter (512). If a sample period has ended (506), then the penultimate-level cache controller compares contents of the last-level cache hit rate counter to a corresponding predetermined threshold value, uses the results of the comparison (508), and resets the last-level cache hit rate counter (510).

Figure 7:
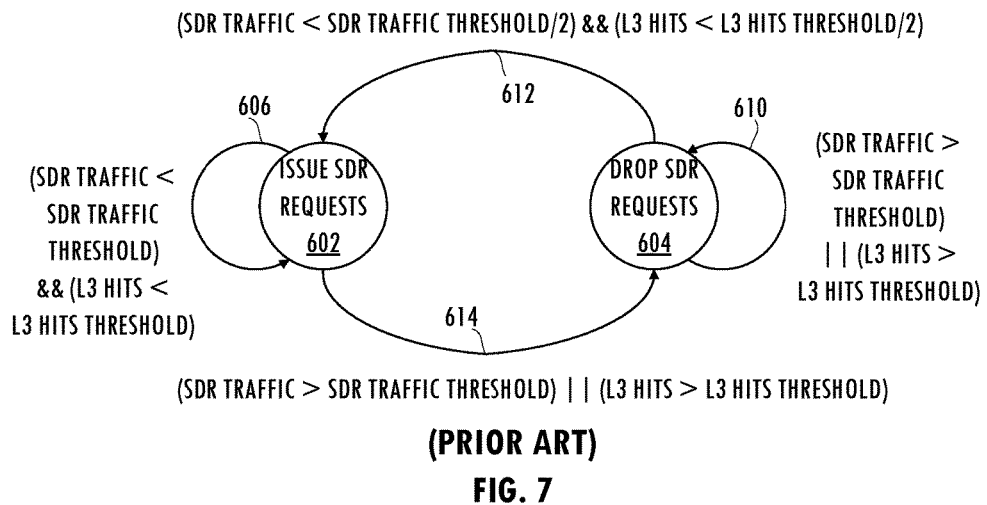
FIG. 7 illustrates a state machine diagram for a speculative DRAM read activity controller included in the multi-core processing system of FIG. 2.

Referring to FIG. 7, the penultimate-level cache controller uses the comparison information. The predetermined thresholds indicate permissible values for the speculative DRAM read request rate and the last-level cache hit rate. If the processing system is in a state having speculative DRAM read requests enabled (602) and both counters are under the corresponding predetermined threshold values (606), then the cache controller continues to issue speculative DRAM read requests. If either of the counters exceeds a corresponding predetermined threshold value (614), then the cache controller disables speculative DRAM read requests (604). The cache controller continues to monitor traffic and accuracy while speculative DRAM read requests are disabled. If either of the counters exceeds a corresponding predetermined threshold value, then speculative DRAM read requests remain disabled (610). However, when each of the counters has a value below a corresponding second predetermined threshold value (e.g., a value below half of the corresponding predetermined threshold value) (612), then the penultimate-level cache controller enables speculative DRAM read requests (602).

Figure 8:
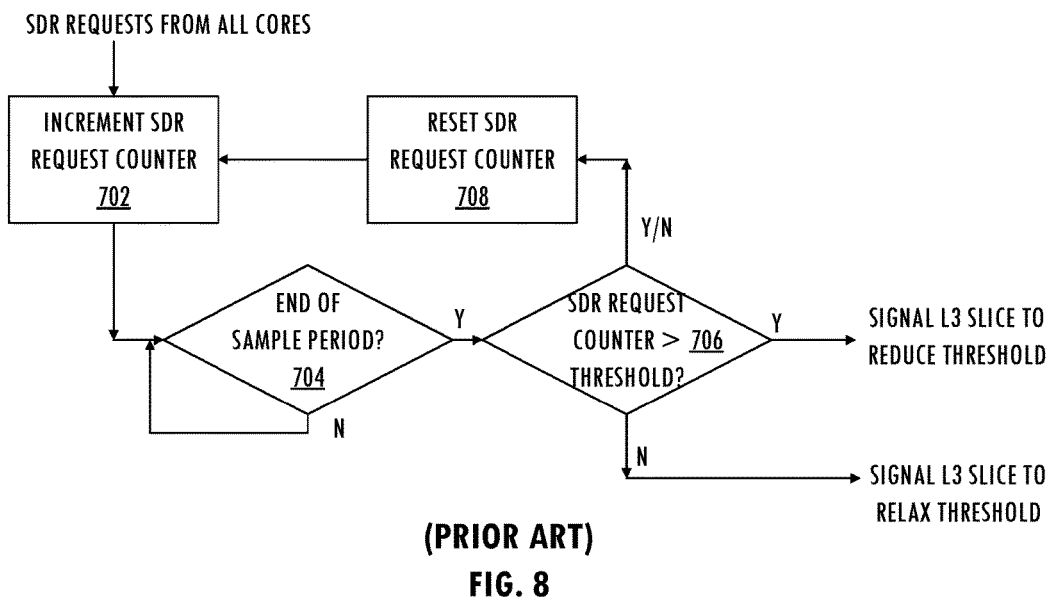
FIG. 8 illustrates an exemplary information and control flow for monitoring speculative DRAM read traffic and accuracy of speculative DRAM read requests of a cluster of processing cores of FIG. 2.

Referring to FIGS. 2 and 3, in at least one embodiment, the cluster interconnect 240 monitors the total number of speculative DRAM read requests sent from any processing core in the cluster of processing cores to main memory 114. That information may be fed back to the corresponding penultimate-level cache controller, which may use that information to adjust the predetermined threshold levels. For example, referring to FIG. 8, cluster interconnect 240 receives speculative DRAM read requests from all processing cores of the cluster and increments a cluster-level speculative DRAM read request rate counter for each received speculative DRAM read request (702). If a sample period has ended (704), cluster interconnect 240 compares the cluster-level speculative DRAM read request rate counter value to a predetermined cluster-level request rate threshold value (706). If the cluster-level speculative DRAM read request rate counter value exceeds the predetermined cluster-level request rate threshold value, then cluster interconnect 240 sends a signal to one or more core cache controllers to reduce the request rate threshold value. If the cluster-level request rate count value is below the predetermined threshold value (or a second predetermined cluster-level request rate threshold value, which may be separately stored or generated based on the predetermined threshold value), then cluster interconnect 240 sends a signal to a cache controller of a corresponding slice of the level-three cache to relax the corresponding speculative DRAM read request rate threshold value. After sending the appropriate signal, cluster interconnect 240 resets the cluster-level speculative DRAM read request rate counter (708). Although the policy described above performs well for execution of one thread on a cluster of cores, the extra traffic generated for multiple threads executing on the cluster of cores degrades system performance and causes a substantial loss of instructions per cycle. As the speculative DRAM read request traffic of a cluster of processing cores increases, the threshold levels may get more stringent, thereby reducing the rate of the speculative DRAM read request injection to lower levels. As speculative DRAM read request traffic of a cluster of processing cores decreases, cache controller may relax the threshold levels.

An intelligent policy for controlling the flow of speculative DRAM read requests may improve performance of speculative DRAM read requests. A speculative DRAM request policy that only issues speculative DRAM read requests that are going to miss in the last-level cache maintains 100% accuracy for speculative DRAM read requests and does not create any wasted traffic at main memory 114. However, the penultimate-level cache controller cannot predict with 100% accuracy which memory requests will hit the last-level cache. Prioritization of a demand memory requests over speculative DRAM read requests may delay beneficial speculative DRAM read requests and reduce their effectiveness. Note that even beneficial speculative DRAM read requests are detrimental under some circumstances. For example, if a memory-intensive thread executes simultaneously with a computation intensive thread, beneficial speculative DRAM read requests from the memory-intensive thread may delay demand memory requests from the computation-intensive thread. The speculative DRAM read requests may provide a slight improvement for the memory-intensive thread but may also cause substantial performance degradation for the computation-intensive thread.

Processing core 202, processing core 204, processing core 206, and processing core 208 generate substantial amounts of prefetch requests to load data into the caches from main memory 114 ahead of time to reduce the number of cache misses. Prefetchers of the processing cores predict cache lines that would be needed by an application in temporal proximity and generate prefetch data read requests based on those predictions. Only some of the prefetch data read requests load useful data into the caches. Since the prefetch data read requests precede the actual core demand requests, speeding up the level-two prefetch responses with speculative DRAM read requests may not reduce latency. Therefore, giving priority to core demand requests for issuing speculative DRAM read requests may limit extra traffic at the memory system due to speculative DRAM read requests. Each level-two cache controller regulates the flow of the speculative DRAM read requests throughout execution and improves accuracy of speculative DRAM read requests, thus improving overall system performance. However, by disabling the speculative DRAM read requests for large periods, the system is unable to extract any performance benefits during those periods. In addition, the performance of speculative DRAM read requests is dependent on selection of the predetermined thresholds, which requires a substantial amount of application-specific adjustments to properly control the rate of speculative DRAM read requests. By monitoring the overall speculative DRAM read request traffic, the scheme lacks the ability to segregate beneficial speculative DRAM read requests from the detrimental speculative DRAM read requests.

A prefetcher based speculative DRAM read request technique intelligently controls injection of speculative DRAM read requests into the memory system using the counter-based mechanism to monitor the speculative DRAM read traffic and accuracy described above. However, the prefetcher based speculative DRAM read request technique implements a selective approach to injecting speculative DRAM read requests into the system. In at least one embodiment of the prefetcher based speculative DRAM read request technique, if the penultimate-level cache controller determines that at least one of the request rate or the hit rate in the last-level cache of the speculative DRAM read requests exceeds a corresponding predetermined threshold value, the penultimate-level cache controller first suppresses speculative DRAM read requests for prefetches. In general, prefetches are issued ahead of their requirement and using speculative DRAM read requests to reduce their latency may not provide any additional benefit. In addition, as discussed above, not all prefetches are useful and issuing speculative DRAM read requests increases memory contention. Thus, the prefetcher based speculative DRAM read request technique first filters out unnecessary traffic, thereby improving speculative DRAM read request accuracy. The counter-based mechanisms described above monitor the speculative DRAM read request rate and last-level cache hit rate. When the penultimate-level cache controller detects that the speculative DRAM read request rate or last-level cache hit rate exceeds the corresponding predetermined threshold value, the penultimate-level cache controller disables issuing prefetch speculative DRAM read requests, which substantially reduces the speculative DRAM read traffic. In addition, if the prefetches hit the last-level cache, the filtering of the prefetch speculative DRAM read requests also improves accuracy of the speculative DRAM read requests. Thus, the selective technique allows the system to extract performance benefits of the speculative DRAM read requests for critical core demand requests and does not flood the memory system with excessive speculative DRAM read requests.

After disabling of prefetch speculative DRAM read requests, the selective technique disables remaining enabled speculative DRAM read requests (i.e., core demand speculative DRAM read requests) in response to occurrence of further threshold violations. When the penultimate-level cache controller resumes issuing speculative DRAM read requests, it first enables the speculative DRAM read requests for core demand requests. If the penultimate-level cache controller determines that the system is capable of handling complete speculative DRAM read traffic, the penultimate-level cache controller enables speculative DRAM read requests for prefetch requests as well.

In at least one embodiment, the prefetcher based speculative DRAM read request technique selectively enables speculative DRAM read requests in the following sequence in response to violations of predetermined thresholds for traffic (e.g., request rate) and accuracy (e.g., last-level cache hit rate):

1. if speculative DRAM read request accuracy or speculative DRAM read request rate violates a corresponding predetermined threshold, then the cache controller first disables the speculative DRAM read requests for prefetches; and 2. if speculative DRAM read requests are disabled for prefetches only, and speculative DRAM read request accuracy or speculative DRAM read request rate violates a corresponding predetermined threshold, then the cache controller disables all speculative DRAM read requests.

The selective technique resumes speculative DRAM read requests in stages as follows:

1. if all speculative DRAM read requests are disabled and speculative DRAM read request accuracy is within a second target range, then the cache controller enables speculative DRAM read requests only for core demand requests. Speculative DRAM read requests for prefetches remain disabled.

2. if only core demand speculative DRAM read requests are enabled and the speculative DRAM read traffic and speculative DRAM read request accuracy are within the second target ranges, then the controller enables speculative DRAM read requests for all misses in the penultimate-level cache.

Figure 9:
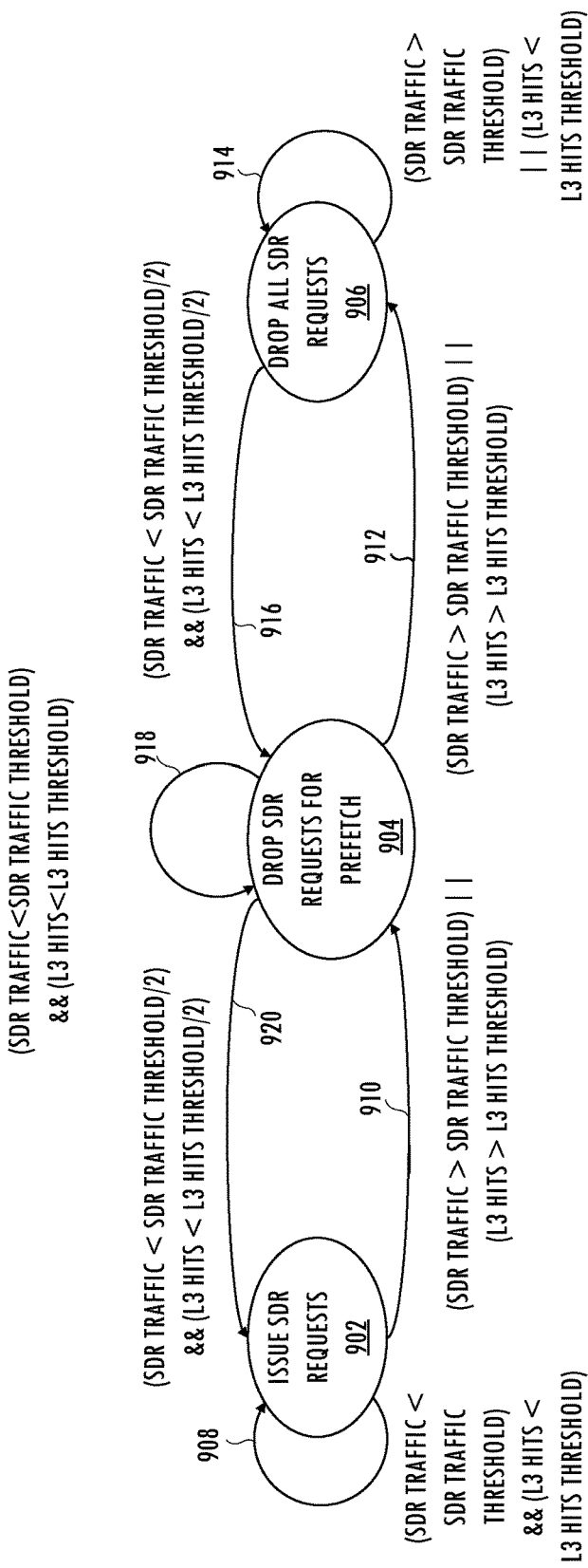
FIG. 9 illustrates a state diagram for prefetcher based speculative DRAM read control in the multi-core processing system of FIG. 2 consistent with at least one embodiment of the invention.

Referring to FIG. 9, in an embodiment of the prefetcher based speculative DRAM read request technique, the penultimate-level cache controller (e.g., level-two cache controller) monitors speculative DRAM read requests and periodically compares the information gathered by the request rate counter and last-level cache hit rate counter to corresponding predetermined threshold values that may be configured during BIOS or other system initialization sequence. The predetermined thresholds indicate permissible values for the speculative DRAM read request rate (e.g., miss rate of the penultimate-level cache) and accuracy (e.g., hit rate in the last-level cache). If the system is in a state having both types of speculative DRAM read requests enabled (902) and the traffic and accuracy counter values are below the corresponding predetermined threshold values (908), then the cache controller continues to issue speculative DRAM read requests for both prefetches and core demand requests. If either of the counters exceeds a corresponding predetermined threshold value (910), then the cache controller disables prefetch speculative DRAM read requests (904). The cache controller continues to monitor traffic and accuracy while prefetch speculative DRAM read requests are disabled and core demand speculative DRAM read requests are enabled. If either of the counters exceeds a corresponding predetermined threshold value (912), then speculative DRAM read requests remain disabled and the cache controller further disables core demand speculative DRAM read requests (906). However, when each of the counters has a value below a corresponding second predetermined threshold value (916), then the cache controller enables core demand speculative DRAM read requests again (904). The second predetermined threshold values may be separately stored or generated based on first predetermined threshold values. The second predetermined threshold values may be more stringent than the first predetermined threshold values (e.g., half of the corresponding predetermined threshold value). If each of the counter values remains under the corresponding predetermined threshold value for at least one period (918), prefetch speculative DRAM read requests remain disabled while core speculative DRAM read requests remain enabled (904). However, once both counter values fall below the corresponding second predetermined threshold value (e.g., ½ the corresponding predetermined threshold value) (920), the penultimate-level cache controller enables prefetch speculative DRAM read requests again (902). Note that although the technique is described as starting the processing system in state 902, other embodiments start processing system operation in state 904 with enabled core demand speculative DRAM read requests and disabled prefetch speculative DRAM read requests, or in state 906 with disabled core demand speculative DRAM read requests and disabled prefetch speculative DRAM read requests.

In at least one embodiment of the prefetcher based speculative DRAM read request technique, the penultimate-level cache controller tightens the traffic threshold and the accuracy threshold in state 904, after disabling speculative DRAM read requests for prefetches, if conditions 912 are true, but before transitioning to state 906. Conversely, the penultimate-level cache controller relaxes the traffic threshold and the accuracy threshold in state 904 if conditions 920 are satisfied, but before enabling speculative DRAM read requests for prefetches. In at least one embodiment of the prefetcher based speculative DRAM read request technique, cluster-level feedback from cluster interconnect 240 causes the penultimate-level cache controller to adjust thresholds to be more stringent and individual cores may violate the thresholds sooner, causing the penultimate-level cache controllers of the processing cores of the cluster to suppress prefetch speculative DRAM read requests on a per-core basis, as required. In other embodiments of the prefetcher based speculative DRAM read request technique, the cluster-level feedback causes all processing cores of the cluster to disable the prefetch speculative level DRAM read requests and/or core demand speculative level DRAM read requests simultaneously.

In at least one embodiment of the prefetcher based speculative DRAM read request technique, the speculative DRAM read request traffic is quantified based on misses in the penultimate-level cache, which includes a count of actual and unrealized speculative DRAM read requests and is compared to a speculative DRAM read request threshold value. Unrealized speculative DRAM read requests are speculative DRAM read requests that would have been issued to the memory system if speculative DRAM read requests were enabled by the penultimate-level cache controller. In at least one embodiment, accuracy is quantified based on a count of the hits in the level-three cache (i.e., the last-level cache) and that count is compared to a level-three cache hit predetermined threshold value.

The selective technique may substantially improve performance by reducing memory contention and speeding up critical core demand read requests. The selective technique reduces the periods in which the system does not issue any speculative DRAM read requests as compared to policies described above. By first suppressing prefetch speculative DRAM read requests, since they are already being issued in advance to core demand of that data, filters the useful speculative DRAM read requests from potentially detrimental speculative DRAM read requests. As a result, the penultimate level cache issues only core demand speculative DRAM read requests, thus reducing unnecessary memory contention improving instructions per cycle.

In the embodiments of the prefetcher based speculative DRAM read request technique described above, the speculative DRAM read request traffic is indicated by the count of speculative DRAM read requests and is compared to a speculative DRAM read request threshold value and speculative DRAM read request accuracy is quantified using a count of the hits in the level-three cache (i.e., the last-level cache) and that count is compared to a level-three cache hit predetermined threshold value. However, other indicators of speculative DRAM read request traffic and speculative DRAM read request accuracy may be used. For example, other embodiments track speculative requests in a buffer and use a corresponding hit rate in the last-level cache for accuracy.

The description of the invention set forth herein is illustrative and is not intended to limit the scope of the invention as set forth in the following claims. For example, while the invention has been described in an embodiment in which the memory system includes three levels of cache and a main memory, one of skill in the art will appreciate that the teachings herein can be utilized with memory systems having other hierarchies. In addition, although the invention has been described in an embodiment in which the main memory 114 is DRAM, one of skill in the art will appreciate that the teachings herein can be utilized with main memory comprising other memory types (e.g., SRAM, phase-change memory, memristors, or other memory type). Variations and modifications of the embodiments disclosed herein, may be made based on the description set forth herein, without departing from the scope of the invention as set forth in the following claims.

What is claimed is:

1. A method for reducing memory access latency of a memory system comprising:
    monitoring a request rate of speculative memory read requests from a penultimate-level cache to a main memory, the speculative memory read requests corresponding to data read requests that missed in the penultimate-level cache, each of the speculative memory read requests being a core demand speculative memory read request or a prefetch speculative memory read request, and each of the data read requests being a core demand data read request or a prefetch data read request;
    monitoring a hit rate of searches of a last-level cache for data requested by the data read requests, each of the speculative memory read requests being issued in parallel with a search of the last-level cache for corresponding data;
    selectively enabling core demand speculative memory read requests to the main memory in parallel with searching of the last-level cache for data of a corresponding core demand data read request based on the request rate and the hit rate; and
    selectively enabling prefetch speculative memory read requests to the main memory in parallel with searching of the last-level cache for data of a corresponding prefetch data read request based on the request rate and the hit rate.

2. The method, as recited in claim 1,
    wherein the core demand speculative memory read requests are enabled and the prefetch speculative memory read requests are enabled, and
    wherein in response to the request rate being greater than a predetermined request rate threshold value or the hit rate being greater than a predetermined hit rate threshold value, the selectively enabling of the core demand speculative memory read requests comprises enabling the core demand speculative memory read requests and the selectively enabling of the prefetch speculative memory read requests comprises disabling the prefetch speculative memory read requests.

3. The method, as recited in claim 2,
    wherein the core demand speculative memory read requests are enabled and the prefetch speculative memory read requests are disabled,
    wherein in response to the request rate being less than a second predetermined request rate threshold value and the hit rate being less than a second predetermined hit rate threshold value, the selectively enabling of the core demand speculative memory read requests comprises enabling the core demand speculative memory read requests and the selectively enabling of the prefetch speculative memory read requests comprises enabling the prefetch speculative memory read requests, and
    wherein the second predetermined request rate threshold value is less than the predetermined request rate threshold value and the second predetermined hit rate threshold value is less than the predetermined hit rate threshold value.

4. The method, as recited in claim 1,
wherein the core demand speculative memory read requests are enabled and the prefetch speculative memory read requests are disabled, and
wherein in response to the request rate being greater than a predetermined request rate threshold value or the hit rate being greater than a predetermined hit rate threshold value, the selectively enabling of the core demand speculative memory read requests comprises disabling the core demand speculative memory read requests and the selectively enabling of the prefetch speculative memory read requests comprises disabling the prefetch speculative memory read requests.

5. The method, as recited in claim 4,
wherein the core demand speculative memory read requests are disabled and the prefetch speculative memory read requests are disabled, and
wherein in response to the request rate being less than a second predetermined request rate threshold value and the hit rate being less than a second predetermined hit rate threshold value, the selectively enabling of the core demand speculative memory read requests comprises enabling the core demand speculative memory read requests and the selectively enabling of the prefetch speculative memory read requests comprises disabling the prefetch speculative memory read requests, and
wherein the second predetermined request rate threshold value is less than the predetermined request rate threshold value and the second predetermined hit rate threshold value is less than the predetermined hit rate threshold value.

6. The method, as recited in claim 1,
wherein the core demand speculative memory read requests are enabled and the prefetch speculative memory read requests are enabled, and
wherein in response to the request rate being less than a predetermined request rate threshold value and the hit rate being less than a predetermined hit rate threshold value, the selectively enabling of the core demand speculative memory read requests comprises enabling the core demand speculative memory read requests and the selectively enabling of the prefetch speculative memory read requests comprises enabling the prefetch speculative memory read requests.

7. The method, as recited in claim 1,
wherein core demand speculative memory read requests are enabled and prefetch speculative memory read requests are disabled, and
wherein in response to the request rate being less than a predetermined request rate threshold value and the hit rate being less than a predetermined hit rate threshold value, the selectively enabling of core demand speculative memory read requests comprises enabling core demand speculative memory read requests and the selectively enabling of prefetch speculative memory read requests comprises disabling prefetch speculative memory read requests.

8. The method, as recited in claim 1,
wherein the core demand speculative memory read requests are disabled and the prefetch speculative memory read requests are disabled, and
wherein in response to the request rate being less than a predetermined request rate threshold value and the hit rate being less than a predetermined hit rate threshold value, the selectively enabling of the core demand speculative memory read requests comprises disabling the core demand speculative memory read requests and the selectively enabling of the prefetch speculative memory read requests comprises disabling the prefetch speculative memory read requests.

9. The method, as recited in claim 1,
monitoring a cluster-level request rate for a plurality of penultimate-level caches coupled to the main memory; and
monitoring a cluster-level hit rate of searching of a shared last-level cache for data requested by data read requests that missed in the plurality of penultimate-level caches,
wherein the selectively enabling of the core demand speculative memory read requests is further based on the cluster-level request rate and the cluster-level hit rate, and
wherein the selectively enabling of the prefetch speculative memory read requests is further based on the cluster-level request rate and the cluster-level hit rate.

10. The method, as recited in claim 9, further comprising:
adjusting a predetermined request rate threshold value or a predetermined hit rate threshold value based on the cluster-level request rate or the cluster-level hit rate, respectively,
wherein the selectively enabling of the core demand speculative memory read requests is further based on the predetermined request rate threshold value and the predetermined hit rate threshold value, and
wherein the selectively enabling of the prefetch speculative memory read requests is further based on the predetermined request rate threshold value and the predetermined hit rate threshold value.

11. The method, as recited in claim 1, wherein each of the speculative memory read requests is an actual speculative memory read request issued in parallel with the searching or an unrealized speculative memory read request.

12. A memory system comprising:
a penultimate-level cache;
a last-level cache;
a main memory;
a first counter configured to store a request rate of speculative memory read requests from the penultimate-level cache to the main memory, each of the speculative memory read requests being in response to a miss in the penultimate-level cache of a corresponding data read request;
a second counter configured to store an indicator of a hit rate of searches of the last-level cache for data of data read requests missed in the penultimate-level cache, and
a controller associated with the penultimate-level cache, the controller being configured to:
selectively enable core demand speculative memory read requests to the main memory in parallel with the searches based on the request rate, the hit rate, a predetermined request rate threshold value, and a predetermined hit rate threshold value; and
selectively enable prefetch speculative memory read requests to the main memory in parallel with the searches based on the request rate, the hit rate, the predetermined request rate threshold value, and the predetermined hit rate threshold value,
wherein each of the speculative memory read requests is a core demand speculative memory read request or a prefetch speculative memory read request.

13. The memory system, as recited in claim 12, wherein the controller is configured to increment the first counter in response to each miss in the penultimate-level cache, increment the second counter in response to each hit in the last-level cache, and periodically reset the first counter and the second counter.

14. The memory system, as recited in claim 12,
wherein selectively enabling of the core demand speculative memory read requests for core demand data read requests is further based on a second predetermined request rate threshold value and a second predetermined hit rate threshold value, and
wherein selectively enabling of prefetch speculative memory read requests is further based on the second predetermined request rate threshold value and the second predetermined hit rate threshold value.

15. The memory system, as recited in claim 12, further comprising:
a cluster interconnect structure coupled between the last-level cache and the main memory, the cluster interconnect structure comprising:
a third counter configured to store a cluster-level request rate of speculative memory read requests from any penultimate-level cache in a cluster of cores to the main memory in parallel with a search of the last-level cache for requested data of a data read request missed in a corresponding penultimate-level cache, the last-level cache being shared by the cores in the cluster of cores; and
a fourth counter configured to store an indicator of a cluster-level hit rate of the speculative memory read requests in the last-level cache for data read requests missed in a corresponding penultimate-level cache.

16. The memory system, as recited in claim 12, further comprising:
wherein the first counter and the second counter are associated with a first thread executing on a core of a cluster of cores, and
wherein the memory system further comprises:
a third counter associated with a second thread executing on the core and configured to store a request rate of speculative memory read requests for the second thread from the penultimate-level cache to the main memory, each of the speculative memory read requests for the second thread being in response to a miss in the penultimate-level cache of a corresponding data read request of the second thread; and
a fourth counter associated with the second thread executing on the core and configured to store an indicator of a hit rate of searches of the last-level cache for data read requests of the second thread missed in the penultimate-level cache.

17. The memory system, as recited in claim 12,
wherein the speculative memory read requests include actual speculative memory read requests issued in parallel with the searches of the last-level cache and unrealized speculative memory read requests, and
wherein the hit rate is based on hits in the last-level cache of the searches.

18. A method for operating a memory system comprising:
enabling core demand speculative memory read requests to a main memory in parallel with searching of a last-level cache for data requested by core demand data read requests that missed in a penultimate-level cache;
disabling prefetch speculative memory read requests to the main memory for data requested by prefetch data read requests that missed in the penultimate-level cache;
monitoring a request rate of speculative memory read requests issued from the penultimate-level cache to the main memory, the request rate being based on core demand speculative memory read requests and unrealized prefetch speculative memory read requests for prefetch data read requests that missed in the penultimate-level cache;
monitoring a hit rate of the searching of the last-level cache; and
in response to the request rate being less than a predetermined request rate threshold value and the hit rate being less than a predetermined hit rate threshold value:
enabling the core demand speculative memory read requests; and
disabling the prefetch speculative memory read requests.

19. The method, as recited in claim 18,
wherein in response to the request rate being greater than the predetermined request rate threshold value or the hit rate being greater than the predetermined hit rate threshold value, the method further comprises: disabling the core demand speculative memory read requests; and disabling the prefetch speculative memory read requests.

20. The method, as recited in claim 18,
wherein in response to the request rate being less than a second predetermined request rate threshold value and the hit rate being less than a second predetermined hit rate threshold value, the method further comprises: enabling of the core demand speculative memory read requests; and enabling of the prefetch speculative memory read requests,
wherein the second predetermined request rate threshold value is less than the predetermined request rate threshold value and the second predetermined hit rate threshold value is less than the predetermined hit rate threshold value.

* * * * *